H. P. KRAFT.
AIR VALVE FOR LIQUID CONTAINING VESSELS.
APPLICATION FILED DEC. 13, 1911.
1,159,687.
Patented Nov. 9, 1915.
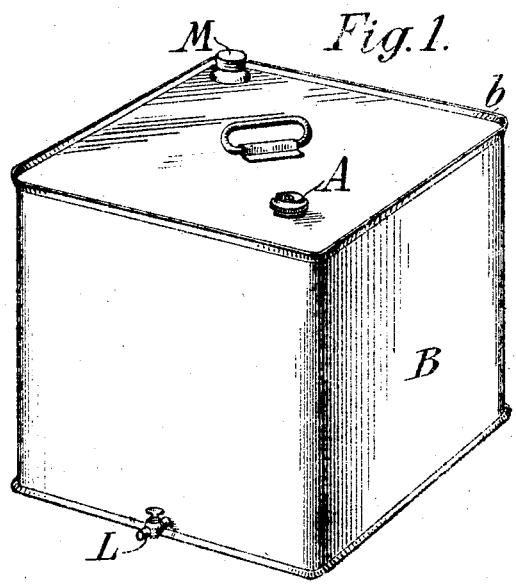
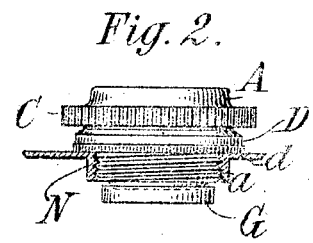
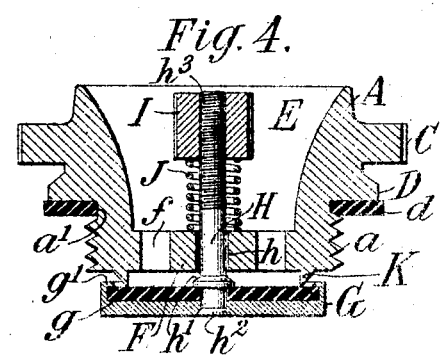
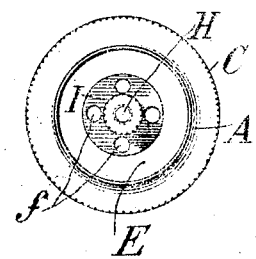
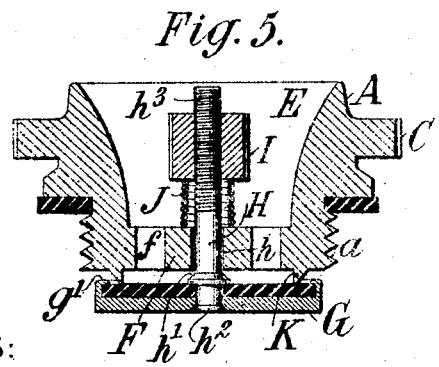
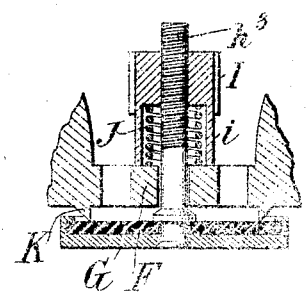
WITNESSES:
INVENTOR
Henry P. Kraft
By Attorneys,

UNITED STATES PATENT OFFICE.

HENRY P. KRAFT, OF RIDGEWOOD, NEW JERSEY.

AIR-VALVE FOR LIQUID-CONTAINING VESSELS.

1,159,687.

Specification of Letters Patent.

Patented Nov. 9, 1915.

Application filed December 13, 1911. Serial No. 665,463.

*To all whom it may concern:*

Be it known that I, HENRY P. KRAFT, a citizen of the United States, residing in Ridgewood, in the county of Bergen and State of New Jersey, have invented certain new and useful Improvements in Air-Valves for Liquid-Containing Receptacles, of which the following is a specification.

My invention relates to a vent plug adapted to be inserted in a can for holding liquids and has for its object to provide a construction of such plug which in use will readily permit the air to flow in to the can and facilitate the drawing of liquid from the can, but which at the same time will automatically close to prevent the leaking of such liquid through said plug.

A further object of the invention is to provide means for fixedly sealing the said vent plug so that the same can be closed during shipment of the can.

A further object is to provide a construction which will be seated close to the can and will not have any objectionable projections which are liable to be caught.

The invention consists in a vent plug adapted to be inserted in a can having air vents therethrough and in combining therewith a valve adapted to close said air vents against the leaking of the fluid but to yield and open said air vents to permit the inflow of air during the withdrawal of liquid from the can. Also a means whereby the said air vents are fixedly closed for shipment or other reasons.

A desirable form in which the invention may be embodied is illustrated in the accompanying drawings, wherein—

Figure 1 illustrates a perspective view of a can having the invention applied thereto; Fig. 2 is a side elevation of the vent plug; Fig. 3 is a top view thereof; Fig. 4 is a vertical enlarged section thereof illustrating the vent plug in adjusted position to permit the withdrawal of liquid from the can; Fig. 5 is a similar view illustrating the parts in position for shipment where the air vents are closed; and Fig. 6 is a modified form of nut.

In the form in which the invention is illustrated in the said drawings the vent plug A is preferably formed with a screw thread $a$ to enable it to be inserted in the can B. A milled gripping portion C is provided to facilitate the convenient inserting of the plug in the can and the plug is formed with a shoulder D upon the lower face of which a washer $d$ is preferably employed to insure close fit with the can, and this washer which is of some flexible material, such as rubber, is usually seated in a groove $a^1$ in the body of the plug.

A recess E may be formed in the upper face of the plug. The plug is preferably made in an annular form and the recess may conveniently be of corresponding shape. The lower wall F of the plug is formed with air vents $f$ of which four are illustrated, but any desirable number may be employed. A valve G is situated adjacent the lower face of the wall F and has a stem H which passes through an aperture $h$ in the lower wall F and extends upwardly within the recess E preferably terminating at or within the upper face of the plug A. The said stem H has preferably formed thereon a shoulder $h^1$ and its outer end is preferably countersunk and riveted within the valve G at $h^2$. The upper end of this valve stem is threaded at $h^3$ and receives a hand nut I which may be milled for convenience of handling. Suitable means are provided for maintaining the valve in its upper position and such means as illustrated comprise a light spring J which is coiled about the stem H, the upper part of said spring contacting with the nut I and the lower part resting upon the wall F.

The valve G may well be provided on its upper face with a washer $g$ of suitable material, such as vulcanized fiber, which is preferably held in position by an annular peripheral flange $g^1$ formed upon the valve G and the upper part of which is turned over the upper surface of the said washer. The washer is also held in position by the shoulder $h^1$ upon the stem H between which and the disk G the said washer passes. A valve seat K preferably annular in form is formed upon the lower face of the plug. A and is preferably reduced in size where it contacts with the washer $g$ so as to easily maintain a tight fit with the said washer.

The can B is of conventional construction with a filling opening closed by the usual cap M and with a faucet L at the lower part to withdraw the liquid therefrom. In using the said cap it will be inserted in the can B in a threaded socket N secured therein for that purpose and the nut I will be adjusted so that the same bears lightly upon the upper part of spring J. This spring is of light construction and easily compressed so that upon the opening of the faucet L the air pressure will cause the valve G to be depressed sufficiently to permit the proper amount of air to flow into the can through the vent $f$ so that the liquid will quickly and readily flow out of the can through the faucet. At the same time should the liquid within the can splash or should the can accidentally become upset the valve G will instantly close and prevent leakage of liquid through the air vents.

When it is desired to fix the valve G in position to close the air vents for shipment or for any other reason, the nut I may be tightened in position by being screwed down sufficiently far so that the valve is held against the valve seat as firmly as is desired.

The valve is illustrated in Fig. 4 with the nut I in its upper position where the coiled spring J will easily yield to permit the passage of liquid out of the can. In Fig. 5 the nut I is in its lower position and the valve is here fixed in position against the valve seat in which no liquid can be drawn from the can through the faucet L. It will be observed that the said vent plug offers no obstruction practically upon the top of the can. It is of such compact construction that its upper surface is substantially even with the bead $b$ with which such cans are customarily provided upon the upper surface. It, therefore, is not easily broken off and does not afford a projection for the catching of passing objects.

Means may be provided, if desired, to seat the valve G by providing the nut I on its lower face with a flange $i$, as shown in Fig. 6, which is adapted to engage the wall F directly when the said nut is in its lower position and thus draw the valve to its seat. This will avoid any liability of breaking the spring.

While the invention has been described with great particularity as to features of construction, it is not necessarily limited to such structural details, as modifications thereof may be made and equivalent devices substituted within the limits of the appended claims.

What I claim is:—

1. A vent plug for cans, having an air vent therein, a valve adapted to normally close said vent against leakage therethrough of liquid in said can and adapted to yield sufficiently to permit entrance of air as liquid is withdrawn from the can, an outwardly extending valve stem, a spring for pressing said valve into closing position, a nut rotatable on said valve stem, said plug having an outwardly facing recess therein within which said valve-stem and nut are located and within which said nut is accessible and operable from the exterior, and a part forming a rigid abutment between said nut and a rigid part of the plug, said nut, when turned, being adapted to draw and rigidly retain said valve against its seat.

2. A vent plug for cans having an air vent therein, a valve adapted to normally close said vent against leakage therethrough of liquid in said can and adapted to yield sufficiently to permit entrance of air as liquid is withdrawn from the can, an exteriorly projecting valve stem, a spring around said valve stem for pressing said valve to closing position, and a rotatable nut on said stem against which said spring presses, said nut having a sleeve adapted to partially house said spring, and which, when the nut is turned to bring the valve to closing position, is adapted to abut against a part of the plug and rigidly seat the valve independently of the interposition and action of said spring.

3. A vent plug for cans having a wide-mouthed recess in its outer side, an air vent, a valve adapted to normally close said vent against leakage therethrough of liquid in said can, and adapted to yield sufficiently to permit entrance of air as liquid is withdrawn from the can, an exteriorly projecting valve stem projecting into said recess, but not beyond it, a spring for pressing said valve to closing position, and a rotatable nut on said stem adapted to be turned to force said valve firmly against its seat, said nut being contained within said recess and acting upon said valve to rigidly seat the same independently of said valve spring.

4. A vent plug for a can having an air vent extending through the plug, a valve adjacent the lower face of the plug and adapted to close said air vent, a threaded stem for said valve extending through the plug, a hand nut threaded on said stem and a spring interposed between said nut and the said plug, said spring adapted to automatically yield to open the valve sufficiently to admit air as liquid is withdrawn from the can and to cause said valve to close said air vent against the leaking of said liquid through said plug, and a flange on said hand nut adapted to engage a wall of said plug when the nut is adjusted and to fix said valve in closed position without undue compression of said spring.

In witness whereof I have hereunto signed my name in the presence of two subscribing witnesses.

HENRY P. KRAFT.

Witnesses:
HENRY M. TURK,
THOMAS F. WALLACE.